United States Patent
Fahlenberg

[15] 3,695,158
[45] Oct. 3, 1972

[54] PHOTOGRAPHIC CAMERA
[72] Inventor: Paul Fahlenberg, Baierbrunn, Germany
[73] Assignee: Compur-Werk Gesellschaft mit beschraenkter Haftung and Co., Munich, Germany
[22] Filed: July 22, 1970
[21] Appl. No.: 57,038

[30] Foreign Application Priority Data

July 30, 1969 Germany..........P 19 38 826.2

[52] U.S. Cl....................95/10 CE, 95/64 C, 95/64 D
[51] Int. Cl..............................................G03b 7/10
[58] Field of Search.........95/10 C, 64 B, 64 C, 64 D, 95/64 R, 10 CE, 10 CT, 10 CD

[56] References Cited

UNITED STATES PATENTS

| | | | |
|---|---|---|---|
| 2,780,971 | 2/1957 | Fahlenberg | 95/10 C |
| 3,072,028 | 1/1963 | Lange | 95/10 C |
| 3,000,280 | 9/1961 | Faulhaber | 95/64 D X |
| 3,500,737 | 3/1970 | Mayr et al. | 95/64 D |

Primary Examiner—Samuel S. Matthews
Assistant Examiner—Russell E. Adams
Attorney—Charles Shepard and Stonebraker and Shepard

[57] ABSTRACT

A photographic camera in which one of the two factors of diaphragm aperture and shutter speed is manually presettable, and the other of the two factors is automatically set by electrical mechanism dependent in part on the value of the preset factor and in part on the brightness of the subject to be photographed, which is measured by a photoresistance. A balancing bridge circuit is used, one branch of which contains the photoresistance, another branch of which contains a resistance element and a sliding wiper element, each of these elements being separately movable relative to the other element. A first motor, controlled in part by the value of the presettable factor, moves the resistance element relative to the wiper element. A second motor, controlled by the balancing bridge circuit, moves the wiper element relative to the resistance element until the bridge is in balance. The movement of this second motor also sets automatically the value of the other exposure factor.

11 Claims, 7 Drawing Figures

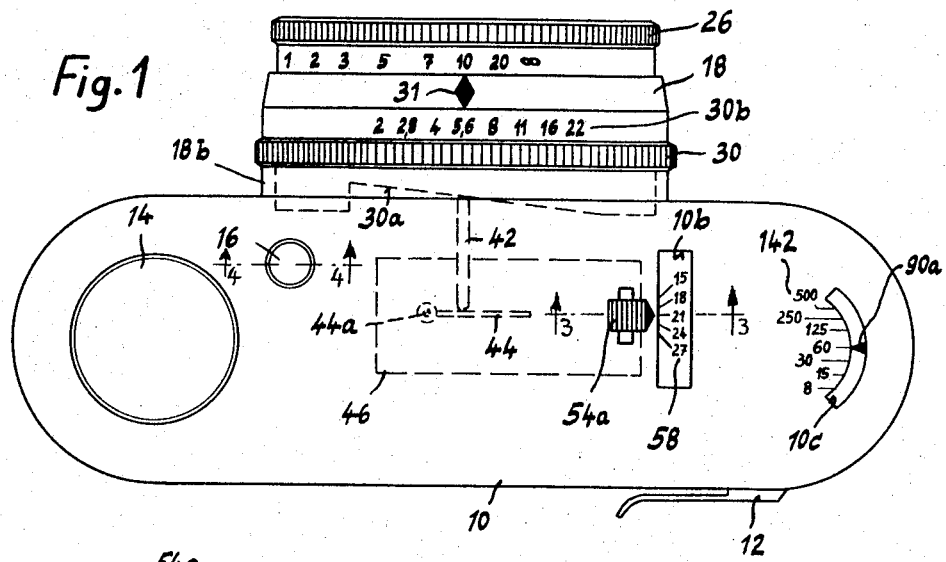
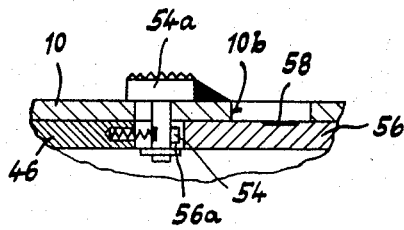
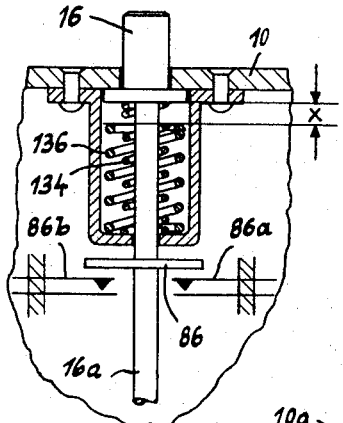
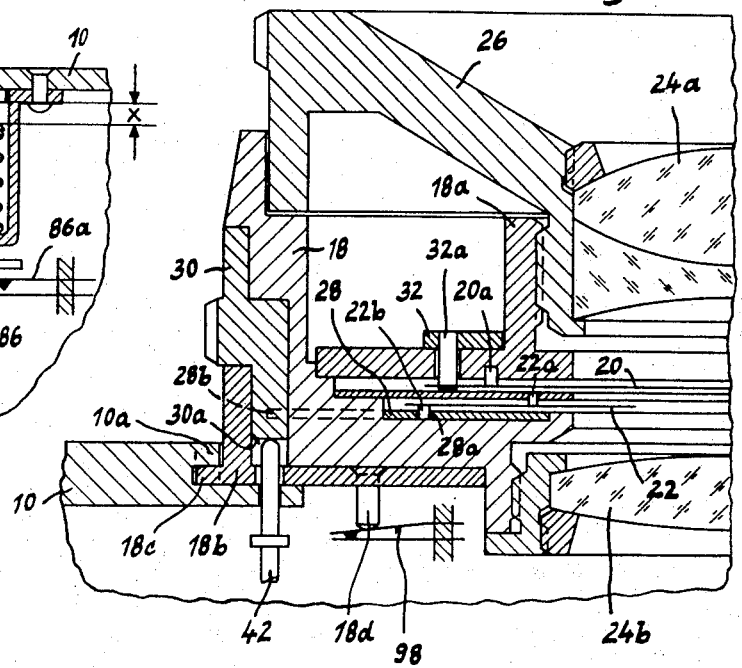

PHOTOGRAPHIC CAMERA

BACKGROUND OF THE INVENTION

As well understood in the photographic art, the two main factors which have to be varied from one exposure to another are the exposure factors of diaphragm aperture and shutter speed or length of exposure. The factor of film speed or sensitivity is also important, of course, but when a strip of film has been placed in the camera and the proper setting for film speed has been made, this setting does not need to be changed again until the camera is loaded with a different film having a different speed or sensitivity, whereas the two factors first mentioned (diaphragm aperture and shutter speed) need to be changed frequently, changes being required often for each individual picture or exposure.

Various arrangements have been proposed for setting one of these two factors automatically after the other one of the two factors has been preset, usually manually, by the photographer. The present invention provides an improved system, including a balancing bridge circuit, for accomplishing this automatic setting of the second factor after the first factor has been preset. An object of the invention, therefore, is the provision of a generally improved and more satisfactory setting system for a photographic camera, and particularly a setting system for automatically setting a second exposure factor after a first exposure factor has been preset.

Another object is the provision of such a setting system which is applicable to cameras of various different types, including single lens mirror reflex cameras, twin lens mirror reflex cameras, and cameras having ordinary viewfinders rather than reflex mirrors.

Still another object is the provision of such a setting arrangement which is applicable also to cameras having interchangeable and replaceable lenses, or interchangeable and replaceable lens and shutter combination units.

A further object is the provision of a setting system wherein the value of the factor which is automatically set is visually indicated to the operator in advance of initiating the exposure cycle, so that if the operator is not satisfied with the automatically set value he can still, before taking the picture, adjust the value of the preset factor in order to obtain a different value for the automatically set factor.

A still further object of the invention is the provision of such a setting system performing some or all of the above mentioned objects, having convenient provision for introducing the factor of film speed or film sensitivity into the setting system.

Another object is the provision of a setting system fulfilling one or more of the above mentioned objects, which is particularly adapted for the automatic setting of the factor of shutter speed or exposure time, the presettable factor being the factor of diaphragm aperture.

BRIEF DESCRIPTION OF THE DRAWINGS

FIG. 1 is a top plan view of a camera in accordance with a preferred embodiment of the invention;

FIG. 2 is a fragmentary axial section, on an enlarged scale, through a portion of the front part of the camera;

FIG. 3 is a vertical section taken approximately on the line 3—3 of FIG. 1, on an enlarged scale;

FIG. 4 is a vertical section, also on an enlarged scale, taken approximately on the line 4—4 of FIG. 1;

DESCRIPTION OF THE PREFERRED EMBODIMENT

Figure 5:
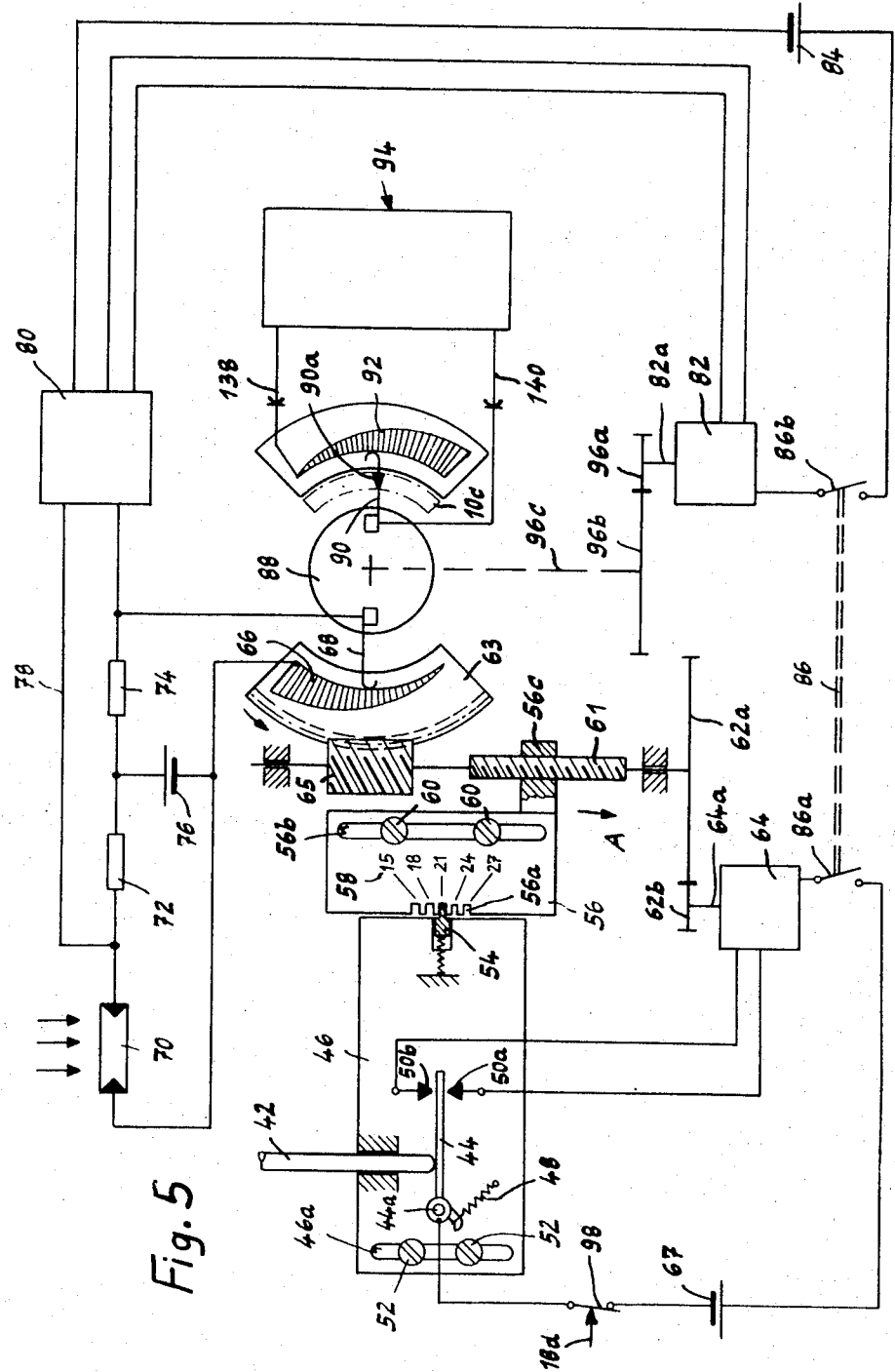
FIG. 5 is a schematic view of some of the principal parts of the preferred construction, together with a wiring diagram.

As already indicated, the present invention is applicable to cameras of many different types. The camera chosen for illustration has a housing or casing 10 of the usual conventional form, and is equipped with a film feeding lever 12 and a rewinding knob 14, these parts being conventional and well understood by those familiar with camera construction. A trip button or release button 16 projects through the top wall of the camera to an accessible position, and is pressed downwardly to make the exposure.

Detachably and replaceably mounted on the front wall of the camera is an interchangeable assembly which may contain the lens and diaphragm only, when the shutter is permanently mounted on the camera, or may contain the lens and diaphragm plus the shutter. In the example here illustrated, the interchangeable unit contains the shutter as well as the lens and diaphragm. It comprises a housing 18 having a number of shutter blades 20 and having a diaphragm assembly including a plurality of diaphragm leaves 22. The front element 24a of the objective or lens is held in a mount 26 in front of the shutter, this mount being screw threaded into a tubular flange 18a on the interchangeable unit 18, so that when the lens mount 26 is turned, the front component of the lens is moved axially forwardly or rearwardly, for focusing purposes. The focus distance scale, seen near the top of FIG. 1, is read in conjunction with a fixed reference point 31 marked on the housing 18. The rear element 24b of the lens is held in a rearwardly projecting tubular flange of the unit 18, in a location behind the shutter and diaphragm.

The diaphragm leaves 22 are of conventional form. Each leaf 22 is mounted on a fixed bearing pin 22a and has a control pin 22b which engages in a control slot 28a in the diaphragm setting ring 28 which is rotatable about the optical axis as a center. The setting ring 28 has an arm 28b extending radially outwardly through a slot and coupled with the outer setting ring 30 of annular form, rotatable on the periphery of the housing 18, with a knurled or serrated outer surface which can be easily grasped by the fingers of the photographer.

Figure 7:
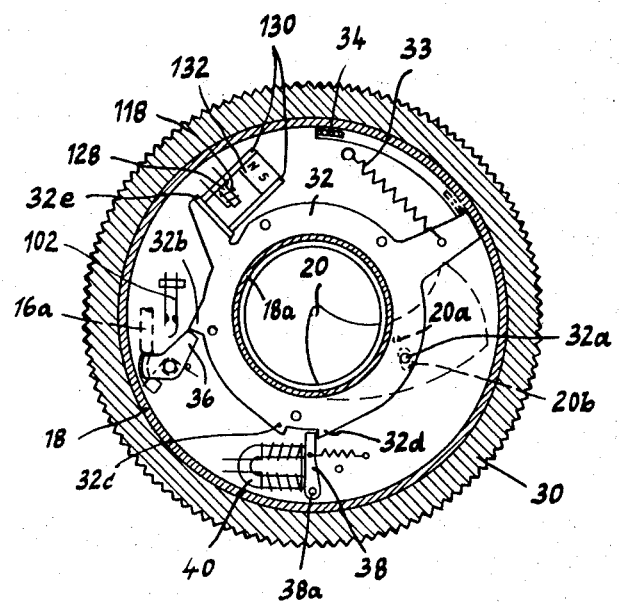
FIG. 7 is a plan of the main parts of the shutter, with parts in transverse section.

Each shutter blade 20 has a bearing pin 20a by means of which it is mounted on a stationary part of the interchangeable unit, such as a stationary plate at the rear end of the tubular extension 18a. As seen in FIG. 7, each shutter blade also has a control slot 20b which engages a control pin 32a of a blade operating ring 32 mounted for rotation about the optical axis. The main driving spring 33 tends to turn the ring 32 in a counterclockwise direction, to swing the blades 20 from one closed position through a fully open position to a second closed position. This is the action when double end or double lobe blades are used. Of course it is equally possible, without departing from the invention, to use single end or single lobe shutter blades, making appropriate change to drive them in a conventional way, first in one direction and then in the opposite direction, from the counterclockwise running down movement of the ring 32. The details of how the shutter blades are driven from the ring 32 are immaterial for purposes of the present invention, any conventional operative driving connection between the ring 32 and the blades (whether they be double lobe blades or single lobe blades) being satisfactory.

The above mentioned main driving spring 33 is tensioned when the ring 32 is turned in a clockwise direction from its run down position. This tensioning or cocking movement of the ring 32 is accomplished through a lug 34 (FIG. 7) which is coupled in a conventional way to the film feeding lever 12 (FIG. 1) so when the lever 12 is operated to fed the film, the lug 34 is swung in a clockwise direction and serves to tension the blade operating ring 32. The ring 32 is held in its cocked or tensioned position by a latch lever or trip lever 36 (FIG. 7) which engages behind a nose 32b on the ring 32.

The ring 32 also has two projections or noses 32c and 32d, between which is the end of a catch lever 38 pivoted on a fixed pivot 38a, this lever constituting the armature of an electromagnet 40, the operation of which will be described below.

The interchangeable unit 18 has firmly connected to its rear portion a bayonet plate 18b having bayonet projections 18c which engage and mate in the usual way with bayonet lugs 10a on the camera housing 10. In the conventional way familiar in the art, the entire unit 18 may be turned slightly about the optical axis to disengage the respective bayonet parts of the interchangeable unit and the camera, and may be taken off the camera. The same unit or a different one having similar bayonet lugs may be attached to the camera by reverse procedure.

The rear end of the diaphragm setting ring 30 is provided with an inclined control cam surface 30a (FIG. 1) having a rise in a direction parallel to the optical axis. The front end of a control pin 42 bears against this control cam 30a, the pin being displaceable in a direction parallel to the optical axis. The rear end of this pin engages a contact member 44 pivotally mounted at 44a on a holder 46. The member 44 is subject to the action of a setting spring 48 (FIG. 5) which tends to swing the member 44 against the rear end of the pin 42 and thus tends to keep the front end of the pin engaged with the inclined control cam 30a.

Two switch contacts 50a and 50b cooperate with the contact member 44. The members 44, 50a, and 50b are mounted in insulated fashion on the holder 46, and the holder is arranged for displacement in a direction parallel to the optical axis, by means of guide screws 52 extending through a guide slot 46a in the holder.

A coupling element 54 mounted on the holder 46 has a tooth engaging in any desired one of the notches 56a in a slide 56. A film speed or film sensitivity scale 58 (FIGS. 1, 3, and 5) associated with the notches 56a is marked on the top surface of the slide 56 and is visible through a window 10b (FIGS. 1 and 3) in the top wall of the camera housing 10. A finger piece 54a on the toothed member 54 is manually accessible on the top of the camera. By moving the finger piece 54a leftwardly (viewed as in FIGS. 1 and 3) against the force of a spring which tends to keep the coupling effective, the tooth may be removed from the notch in which it is seated, and the holder 46 may be moved forwardly or backwardly relative to the slide 56 and may be recoupled thereto by placing the tooth in any other appropriate notch. The slide 56 is guided for displacement in a direction parallel to the optical axis (and parallel to the movement of the holder 46) by guide screws 60 passing through a guide slot 56b in the slide 56.

The slide 56 has a lateral arm 56c having therethrough a threaded opening engaged with the threads of a worm 61 rotatable on an axis parallel to the optical axis, which worm is driven by gears schematically shown at 62a and 62b from the shaft 64a of an electric motor 64. This motor is powered from a battery 67, the circuit passing through the contact member 44 and one or the other of the associated switch contacts 50a and 50b, the direction of rotation of the motor depending upon whether the current comes through the contact 50a or the contact 50b.

The above mentioned worm 61 is rigidly connected to a second worm 65 so that they turn together. The worm 65 engages a toothed segment 63 of arcuate form, so that rotation of the worm will swing the segment in the arc of a circle. Secured to the segment and movable bodily with it is a resistance element 66 which cooperates with a sliding wiper member 68. The members 66 and 68 are in one leg or branch of a balancing bridge. Another branch of the balancing bridge contains the photoresistance 70, which is responsive to the brightness of the object to be photographed, that is, the light reflected from or originating at the object being photographed. Other resistances 72 and 74, and the battery 76, are connected in the balancing bridge, in the manner clearly indicated in FIG. 5.

The partial voltage of the photoresistance 70 is transmitted through the conductor 78 to an amplifier 80 which in turn is connected to a further electric motor 82 powered by a battery 84 in the manner shown. The main current circuits of both motors 64 and 82 go though a main switch 86 having switch portions 86a and 86b for the respective motors.

The previously mentioned sliding wiper 68 is mounted on a rotary plate 88 rotatable concentrically with the arcuate motion of the segment 63. This rotary plate 88 also has a second sliding wiper 90 mounted thereon to move bodily therewith. The wiper 90 engages with an arcuate resistance member or element 92 which is mounted in stationary position. This resistance 92 is the time-determining resistance of an electronic circuit diagrammatically designated in FIG. 5 at 94, and shown in greater detail in FIG. 6. This electronic circuit controls the shutter speed or exposure time.

The shaft 82a of the motor 82 drives gearing 96a and 96b which, through the shaft 96c serves to turn the rotary plate 88, thereby moving the position of the sliding wiper 90 with respect to the resistance element 92 and simultaneously moving the sliding wiper 68 relative to the resistance element 66. The wiper 90 carries a conspicuous mark 90a (FIGS. 1 and 5) which is visible to the photographer through an arcuate window 10c in the top wall of the camera housing 10, and the position of the wiper may be read with reference to a shutter speed scale or exposure time scale 142 (FIG. 1).

In the circuit of the motor 64 there is a safety switch 98 (FIGS. 2 and 5) which is open when there is no interchangeable unit 18 mounted on the front of the camera, and which is closed whenever a unit 18 is properly mounted on the camera, by means of a pin 18d on the interchangeable unit, engaging with the switch to close it.

In the specific form of shutter here illustrated as an example, the double lobe blades 20 open and then close again during the cocking or tensioning motion. With such a shutter, supplementary blades known per se in the art and constituting what is sometimes called a cover blind, are used to prevent accidental exposure of the film during the tensioning or cocking of the main shutter blades. Such supplementary blades are suitably connected in known manner to the shutter trip or release member 16, to be opened shortly before the opening of the main shutter blades 20 and are closed shortly after the completion of the exposure. Since such supplementary blades are well known and since they do not constitute part of the present invention, they are not illustrated in the present drawings, to avoid confusing or obscuring the illustration of the parts which are shown. With other types of shutters which may be used with the invention, such supplementary blades may not be necessary.

As already mentioned, the pivoted member 38 (FIG. 7) constitutes the armature of an electromagnet 40. This electromagnet 40, installed in the shutter housing 18, is arranged in an electronic circuit for controlling the shutter speed or exposure time, as illustrated in FIG. 6. The circuit includes a battery 100 for providing the current source, a switch 102, and two feedback transistors 104 and 106. A capacitor 108 (FIG. 6) and the resistance 92 (FIG. 5) together constitute the RC member or resistance-capacitance member of this arrangement. The circuit also includes resistances 110 and 112 arranged as illustrated in FIG. 6, and a potentiometer 114 adjustable to trim or adjustify the circuit.

A further transistor 116 is associated with the capacitor 108 and is made conductive by an induction impulse from a coil 118. When this transistor 116 becomes conductive, it initiates discharge of the capacitor 108 through the resistance 120. The form of the induction impulse is controlled by a capacitor 122, a diode 124, and a resistance 126.

The above mentioned coil 118 surrounds a metallic transverse pin 128 (FIG. 7) which is connected to the pole shoes 130 of a permanent magnet 132 secured in the shutter housing. The shutter blade operating ring 32 has a metallic finger 32e which bears against the pole shoes 130 in the vicinity of the coil 118, when the shutter mechanism is in the cocked or tensioned position shown in FIG. 7.

The shutter trip or release member 16 (FIG. 4) is subject to the effect of a return spring 134 and also a more powerful spring 136 which constitutes a resilient abutment or pressure point. Initial downward pressure on the release button 16, through the distance indicated in FIG. 4 at "X", is resisted only by the comparatively light spring 134, and at the completion of this initial downward movement, the trip comes against the heavier spring 136 so that this resistance point or pressure point can be readily felt by the finger of the operator. The initial movement through the distance "X" is sufficient to cause an insulated collar 86 on the trip member to engage and close the two switches 86a and 86b, but is not sufficient to initiate the actual exposure cycle. Further downward movement of the trip member 16, against the greater resistance of the stronger spring 136, causes the shank or extension 16a of the trip member to engage the tail of the shutter latch 36 (FIG. 7) and swing this latch to the released position to start the running down movement of the shutter blade operating ring 32 and simultaneously to close the switch 102, thus initiating the exposure cycle.

Figure 6:
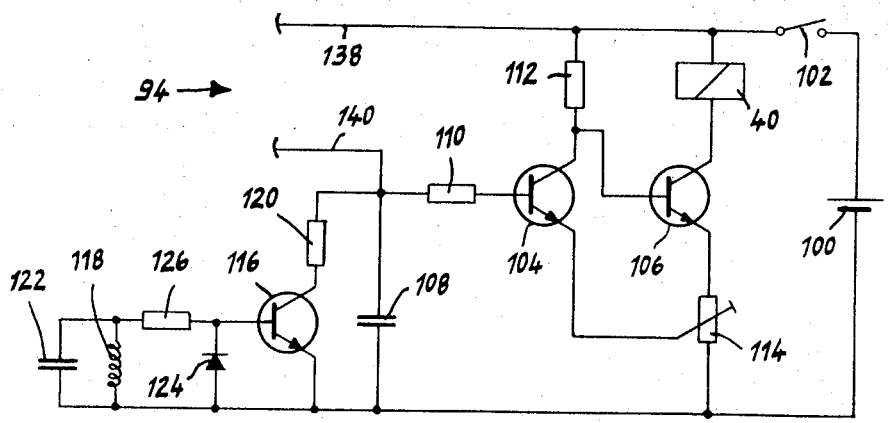
FIG. 6 is a wiring diagram of the electronic arrangement for controlling the shutter speed or exposure time.

The circuit arrangement illustrated in FIG. 5, with the exception of the control unit 94, is installed in the camera housing 10. The photoresistance 70 is placed in the camera housing behind the lens, in a way which is conventional and therefore not specifically illustrated, so that it serves for an internal measuring of the brightness of the photographic subject. The control unit 94, having the circuit illustrated in FIG. 6, is installed in the housing 18 of the interchangeable lens and shutter unit. The conductors 138 and 140 of this control unit 94 are in the form of sliding contacts which automatically couple with the associated mating contacts in the camera housing when the interchangeable unit 18 is mounted on the camera.

The operation is as follows: When the camera is loaded with a fresh supply of film, the operator should make sure that the film speed or film sensitivity adjustment is properly set for the speed of the film. The existing setting is observed by observing the film speed scale 58 with reference to the pointed end of the finger piece 54a. If it is not already set to the required value, the finger piece 54a is moved leftwardly against the force of its spring, to disenage the tooth 54 from the notches 56a, and the finger piece is then moved forwardly or rearwardly, as the case may be, in an axial direction, to bring the pointed end opposite the correct scale graduation, and is then released to move rightwardly under the influence of its spring, into the appropriate notch.

Before taking a photograph, the user must tension or cock the shutter. In the particular camera here illustrated as an example, this is done by moving the film feeding lever 12 since the film feeding mechanism is connected in the conventional way to the shutter tensioning mechanism, in this particular camera. However, it will be realized that this feature is not essential to the invention, and it does not matter, so far as the present invention is concerned, whether the shutter is tensioned by the film feeding mechanism or is tensioned by operating some separate tensioning or cocking device, known per se in the art.

The photographer now selects and presets one of the two exposure factors (diaphragm aperture and shutter speed) leaving the second factor to be set automatically in accordance with light conditions. In the construction here disclosed as a preferred embodiment of the invention, the preset factor is the factor of diaphragm aperture, and the automatically set factor is the factor of shutter speed or exposure duration. It will be realized, however, that the invention is applicable to a construction in which this is reversed, and in which the preset factor is shutter speed and the automatically set factor is diaphragm aperture.

To set the preset factor of diaphragm aperture according to the preferred embodiment of the invention, the photographer grasps the external serrated portion of the ring 30 and turns it to bring the appropriate numeral of the diaphragm aperture scale 30b opposite the fixed index mark 31. When the member 30 is turned, the cam surface 30a thereof causes movement, in a direction parallel to the optical axis, of the pin 42, which acts on the contact member 44 to swing it rearwardly or allow it to swing forwardly, as the case may be. Assuming, for example, that the adjusting ring 30 is turned in the direction of a smaller diaphragm aperture (larger number on the scale 30b) this will move the pin 42 rearwardly, to swing the contact member 44 rearwardly so that it will engage the rear contact 50a (FIG. 5). The photographer now presses the trip or release member 16 downwardly against the force of the spring 134, but only a short way downwardly (through the distance "X" in FIG. 4) until the resistance of the stronger spring 136 is felt. This limited downward movement is sufficient to close the contacts 86a and 86b of the main switch 86, thereby connecting both of the motors 64 and 82 to their respective current sources 67 and 84. The safety switch 98 will, of course, be already closed at this time, because of the presence of the interchangeable unit mounted on the front of the camera body. If the trip 16 is depressed when there is no interchangeable unit mounted on the camera body, the safety switch 98 will be open and the circuit to the motor 64 will be incomplete.

Assuming that the adjustment of the preset exposure factor member 30 has resulted in swinging the member 44 rearwardly to engage the contact 50a, then the closing of the switch 86a by partial depression of the trip member 16 will result in rotation of the motor 64 in one direction, for example, in a direction to turn the worm 61 clockwise and draw the slide 56 rearwardly, which will draw the holder 46 rearwardly with it, on account of the coupling between the members 46 and 56. This rearward motion continues until the pivot 44a of the contact member 44 moves far enough rearwardly, relative to the rear end of the pin 42, so that the spring 48 can swing the contact member 44 forwardly to disengage it from the contact 50a and place it in a neutral or rest position, whereupon the circuit to the motor 64 is broken and the motor stops. If the adjustment of the member 30 was such that the contact member 44 was initially in engagement with the contact 50b rather than the contact 50a, the motor 64 would be driven in the opposite direction and the members 56 and 46 would be moved forwardly rather than rearwardly, until the contact between the members 44 and 50b was opened.

The above described rearward motion of the slide 56 and holder 46 has been accompanied by rearward swinging of the sector 63, since the worm 65 which controls this sector is connected to and turns with the worm 61. This has served to move the resistance element 66 with respect the sliding wiper 68, to a position corresponding to the diaphragm aperture value which has been preset by turning the member 30. In the case illustrated in FIG. 1, the diaphragm has been set to the aperture "5.6", so the action of the motor 64 has set the segment 63 and the resistance element 66 to a position corresponding to this diaphragm aperture value.

The closing of the main switch 86 has also furnished power, as above mentioned, from the battery 84 to the motor 82, so that this motor begins to turn in one direction or the other, depending upon the amplifier 80 which is controlled by the output of the balancing bridge circuit. Since the balancing bridge circuit includes the resistance element 66 which has been or is in process of being set to a position corresponding to the preset diaphragm aperture, and since the balancing bridge circuit also includes the photoresistance 70 responsive to the brightness of the scene to be photographed, the bridge circuit will feed the amplifier 80 in accordance with these factors. The motor 82 will turn the plate 88 in one direction or the other, swinging the sliding wiper 68 over the resistance element 66 until balance is achieved in the bridge circuit. When balance is achieved, there will be no further current flow to the amplifier 80 and no further current flow through the amplifier to the motor 82, so the rotation of the plate 88 will stop.

Meanwhile, however, the movement of the wiper 68 by rotation of the plate 88 has been accompanied by corresponding movement of the other wiper 90 mounted on the same rotary plate 88. So this has brought the wiper 90 to a position resulting from the balancing of the bridge circuit, and thus to a position depending upon the brightness of the subject being photographed, as determined by the photoresistance 70, plus the preset exposure factor, in this case the diaphragm aperture factor as set on the rotary member 30. The sliding wiper 90 is now in a position determining a specific resistance value in the resistance member or element 92, and this may be referred to as a value which is stored ready for feeding into the control unit 94 of the shutter. Of course this value is responsive also to the preset film speed or film sensitivity adjustment which has previously been made.

Since the plate 88 has now come to rest (upon balancing of the bridge circuit) and the sliding wiper 90 is in a stationary position, the position thereof may readily be observed by the photographer, noting the relation of the conspicuous mark or arrow 90a with respect to the shutter speed scale 142. If the photographer is not satisfied with the indicated shutter speed, he does not press the trip or release member 16 further downwardly to initiate the exposure, but instead, can set a different diaphragm aperture in order to obtain a different shutter speed. Thus he can set a larger diaphragm aperture to obtain a faster shutter speed, or he can set a smaller diaphragm aperture to obtain a slower shutter speed.

When the photographer is satisfied with the indicated value of the shutter speed factor as stored in the resistance member 92, he then applies more downward pressure to the release plunger or trip member 16, to overcome the greater resistance of the stronger spring 136, continuing downward movement until the extension 16a of the release member engages the latch 36 (FIG. 7) and moves this latch to a release position, simultaneously closing the switch 102 (FIGS. 6 and 7) so that the power of the battery 100 is applied to the shutter operating and timing circuit shown in FIG. 6, bearing in mind that the timing resistance 92 (FIG. 5) is part of this circuit.

At this time, the capacitor 108 still has a residual charge remaining from the preceding exposure.

Because of various influences, this residual charge is not of a constant quantity, but it is always below the base of the emitter voltage of the first transistor 104. Since there is a voltage drop at the common emitter resistance 114 when the battery 100 is applied, and this increases the emitter voltage of the transistor 104, the triggering of this transistor cannot be assured at this time. Thus the transistor 104 becomes blocked, while the transistor 106 becomes conductive, and the electromagnet 40 is energized. This retains its armature 38, which has been pressed up against the electromagnet 40 during the cocking or tensioning of the shutter, this position being shown in FIG. 7.

When the latch 36 has been released, the ring 32 begins to run down in a counterclockwise direction under the influence of its spring 33, and its arm 32e begins to move away from the permanent magnet 130, 132. This movement of the arm away from the permanent magnet produces a short induction impulse in the coil 118. This is transmitted to the transistor 116 in the form of a pulse which renders this transistor temporarily conductive, and permits discharge of the capacitor 108 from its residual voltage to zero voltage. When this discharge has taken place, a new charging of the capacitor 108 from the battery 100 immediately starts.

The blade operating ring 32, continuing its counterclockwise running down motion (upon release of the latch 36) moves from the tensioned position shown in FIG. 7 to a position in which the projection or nose 32c bears against the holding armature 38. The armature cannot move aside at this time because it is still held tightly against the electromagnet 40, as current is still flowing through the winding of this electromagnet. The blade operating ring 32 thus stops its motion at an intermediate point, in which position the shutter blades 20 are open. The blades remain open as long as the electromagnet 40 continues to be energized to hold the armature 38 tight against it.

After a lapse of time determined by the effective resistance value of the time-setting resistance 92, the capacitor 108 reaches a response voltage of the trigger, and this reacts. The transistor 104 becomes conductive and the transistor 106 is blocked or non-conductive. This stops the flow of current through the winding of the electromagnet 40, so that this electromagnet becomes de-energized, and the armature 38 drops away from the electromagnet, allowing the blade operating ring 32 to resume its counterclockwise rotation, running down to its rest position, thereby reclosing the shutter blades 20. This terminates the exposure operation.

It is pointed out that the setting arrangement according to this invention, involving the storage and preliminary display of the automatically set values of the factors affecting the photograph, may be applied to various types of camera other than the particular camera illustrated in the drawings as an example. It may, for example, be applied to single lens reflex cameras, with or without interchangeable lenses.

What is claimed is:

1. A photographic camera having settable factors of diaphragm aperture and shutter speed to be set for making an exposure, one of said factors being presettable by the photographer, the other of said factors being settable automatically, said camera comprising a setting member (30) movable to preset the presettable one of said factors, an electric circuit forming a balancing bridge system having a group of balancing resistances in which said settable factors may be stored, said balancing resistances including a photoresistance (70) responsive to the brightness of a subject to be photographed and a resistance (66) associated with the factor which is preset, a sliding wiper (68) cooperating with said last mentioned resistance and constituting part of said bridge system, two switch contacts (50a, 50b) and a switch member (44) movable into engagement with either one of said contacts, a movable holder (46) on which said contacts and switch member are mounted, a movable carrier (63) for said resistance, a source of current (67), a motor (64) driven from said source of current under control of said contacts, means (30a, 42) controlled by said setting for moving said switch member, and transmission means (61, 62, 65) operated by said motor for moving said holder, to vary the relation thereof to said setting member, and for moving said carrier, to vary the relation thereof to said sliding wiper.

2. A camera as defined in claim 1, wherein said camera has an optical axis, and wherein said means controlled by the setting member for moving said switch member includes a setting pin (42) displaceable in a direction parallel to said optical axis, and wherein said movable holder (46) is also movable in a direction parallel to said optical axis.

3. A camera as defined in claim 2, further comprising a slide (56) movable in a direction parallel to said optical axis, a releasable coupling for coupling said slide to said holder in a plurality of positions of adjustment, and a film sensitivity scale (58) for indicating the position of adjustment of said slide relative to said holder, said transmission means acting on said slide to move it and thereby to move said holder through the coupling of said slide to said holder.

4. A camera as defined in claim 1, further comprising a second motor (82), and a rotary plate (88) driven by said second motor, said sliding wiper (68) being mounted on and moving with said rotary plate.

5. A camera as defined in claim 4, wherein said second motor is driven from a source of current (84) through an amplifier (80) connected to and controlled by said balancing bridge system.

6. A camera as defined in claim 4, further comprising electric circuit means for determining said automatically settable photographic factor, said circuit means including a second resistance (92) and a second sliding wiper (90) movable over said second resistance to vary the effective resistance thereof in said circuit means, said second sliding wiper (90) being mounted on and moving with said rotary plate (88).

7. A camera as defined in claim 6, further comprising a scale (142) graduated in terms of shutter speed, and a marker (90a) carried by said second sliding wiper (90) for cooperation with said scale (142).

8. A camera as defined in claim 1, further comprising electric circuit means for determining said automatically settable photographic factor as a result of the setting of said presettable factor and the brightness of the subject as influencing said photoresistance, and a scale for indicating a value of said automatically settable factor as determined by said electric circuit means.

9. A camera as defined in claim 1, wherein said presettable factor is the factor of diaphragm aperture and is manually settable, and wherein said factor settable automatically is the factor of shutter speed.

10. A photographic camera having settable factors of diaphragm aperture and shutter speed to be set for making an exposure, one of said exposure factors being presettable by the photographer, the other of said exposure factors being settable automatically, said camera comprising a setting member movable to set the presettable factor, means forming a balancing bridge circuit including a first branch and a second branch, said first branch including a photo-resistance responsive to the brightness of a subject to be photographed, said second branch including a resistance element and a sliding wiper contacting therewith in various positions to vary the effective resistance of said element in said second branch, a first motor for moving said resistance element relative to a given position of said sliding wiper, means controlled by said setting member of the presettable factor for operating said first motor, a second motor for moving said sliding wiper relative to a given position of said resistance element, means responsive to relative resistance characteristics of said first branch and said second branch for operating said second motor to move said sliding wiper until a balance is achieved in said bridge circuit, and means responsive to operation of said second motor for setting the automatically settable one of said exposure factors.

11. A camera as defined in claim 10, further comprising visible indicating means for visually indicating the value of the automatically settable exposure factor which has been set upon operation of said second motor, electric current means for furnishing power to both of said motors, first switch means no normally open and closable to connect said current means operatively to said motors, second switch means normally open and closable to initiate a photographic exposure cycle, and a camera trip member manually movable when a photograph is to be taken, said trip member being effective at an intermediate point of its full range of travel to close said first switch means without closing said second switch means, so that said motors may be operated and the value of the automatically settable exposure may be visually observed without initiating an exposure cycle, said trip member upon further movement beyond said intermediate point to its full range limit being effective to close said second switch means also, so that an exposure cycle is initiated.

* * * * *